（12）United States Patent
Girmonsky (10) Patent No.: US 10,277,475 B2
(45) Date of Patent: Apr. 30, 2019

(54) SYSTEM AND METHOD FOR DYNAMICALLY TESTING NETWORKED TARGET SYSTEMS (71) Applicant: CA, Inc., Islandia, NY (US)

(72) Inventor: Alon Girmonsky, Tel Aviv (IL)

(73) Assignee: CA, Inc., Islandia, NY (US)

( * ) Notice: Subject to any disclaimer, the term of this patent is extended or adjusted under 35 U.S.C. 154(b) by 0 days.

(21) Appl. No.: 15/227,560

(22) Filed: Aug. 3, 2016

(65) Prior Publication Data

US 2016/0342507 A1 Nov. 24, 2016

Related U.S. Application Data (63) Continuation of application No. 14/445,922, filed on Jul. 29, 2014, now Pat. No. 9,559,915.

(60) Provisional application No. 61/885,013, filed on Oct. 1, 2013.

(51) Int. Cl.
*G06F 11/00* (2006.01)
*H04L 12/24* (2006.01)
*H04L 12/26* (2006.01)
*G06F 11/36* (2006.01)

(52) U.S. Cl.
CPC ........ *H04L 41/5009* (2013.01); *G06F 11/368* (2013.01); *G06F 11/3692* (2013.01); *G06F 11/3696* (2013.01); *H04L 41/5038* (2013.01); *H04L 43/08* (2013.01); *H04L 43/50* (2013.01); *H04L 43/062* (2013.01)

(58) Field of Classification Search
CPC .............. G06F 11/368; G06F 11/3688; G06F 11/3684; G06F 11/3664; G06F 11/079; H04N 21/4104; H04M 3/242
See application file for complete search history.

(56) References Cited

U.S. PATENT DOCUMENTS

| | | | |
|---|---|---|---|
| 5,218,605 A | 6/1993 | Low et al. | |
| 6,012,152 A * | 1/2000 | Douik | G06F 11/0709 714/26 |
| 6,249,886 B1 * | 6/2001 | Kalkunte | G06F 11/3414 714/39 |
| 6,502,102 B1 | 12/2002 | Haswell et al. | |
| 6,546,513 B1 | 4/2003 | Wilcox et al. | |
| 7,028,223 B1 | 4/2006 | Kolawa et al. | |
| 7,209,851 B2 | 4/2007 | Singh et al. | |
| 7,840,851 B2 | 11/2010 | Hayutin | |
| 7,844,036 B2 | 11/2010 | Gardner et al. | |
| 8,060,791 B2 | 11/2011 | Hayutin | |
| 8,239,831 B2 | 8/2012 | Brennan et al. | |
| 8,276,123 B1 * | 9/2012 | Deng | G06F 11/3688 714/37 |
| 8,306,195 B2 | 11/2012 | Gardner et al. | |
| 8,341,462 B2 | 12/2012 | Broda et al. | |

(Continued)

*Primary Examiner* — Bryce P Bonzo
*Assistant Examiner* — Jeison C Arcos
(74) *Attorney, Agent, or Firm* — Pillsbury Winthrop Shaw Pittman LLP (57) ABSTRACT

A computerized method and system for conducting performance testing of a networked target system (NTS). The method comprises receiving at least one instruction and at least one parameter generated respective of a plurality of actions provided in a received test specification; testing the performance of the NTS using the at least one instruction and the at least one parameter; and gathering information respective of the performance testing of the NTS.

25 Claims, 4 Drawing Sheets

(56) References Cited

U.S. PATENT DOCUMENTS

| Patent/Publication | Date | Inventor | Classification |
|---|---|---|---|
| 8,510,600 B2 | 8/2013 | Broda et al. | |
| 8,839,035 B1 * | 9/2014 | Dimitrovich | G06F 11/3688 714/25 |
| 2002/0052820 A1 * | 5/2002 | Gatto | G06Q 40/00 705/36 R |
| 2002/0133575 A1 | 9/2002 | Cidon et al. | |
| 2003/0110421 A1 | 6/2003 | Kurinami et al. | |
| 2004/0215673 A1 | 10/2004 | Furukawa et al. | |
| 2004/0260516 A1 | 12/2004 | Czerwonka | |
| 2006/0015294 A1 | 1/2006 | Yetter et al. | |
| 2006/0291398 A1 | 12/2006 | Potter et al. | |
| 2007/0083630 A1 * | 4/2007 | Roth | G06F 11/3688 709/223 |
| 2008/0066009 A1 | 3/2008 | Gardner et al. | |
| 2009/0244290 A1 * | 10/2009 | McKelvey | H04N 7/173 348/181 |
| 2010/0332479 A1 * | 12/2010 | Prahlad | G06F 17/30082 707/741 |
| 2011/0066892 A1 | 3/2011 | Gardner et al. | |
| 2012/0017165 A1 | 1/2012 | Gardner et al. | |
| 2012/0246310 A1 | 9/2012 | Broda et al. | |
| 2013/0060933 A1 * | 3/2013 | Tung | G06F 11/3495 709/224 |
| 2013/0097307 A1 | 4/2013 | Vazac et al. | |
| 2013/0111257 A1 | 5/2013 | Broda et al. | |
| 2013/0132774 A1 * | 5/2013 | Somendra | G06F 11/3688 714/32 |
| 2014/0214496 A1 * | 7/2014 | Macbeath | G06Q 30/0283 705/7.37 |
| 2014/0215271 A1 * | 7/2014 | Oh | G06F 11/3442 714/31 |
| 2014/0325275 A1 * | 10/2014 | Oh | G06Q 10/20 714/25 |
| 2017/0220459 A1 * | 8/2017 | Kulkarni | G06F 11/3688 |

* cited by examiner

SYSTEM AND METHOD FOR DYNAMICALLY TESTING NETWORKED TARGET SYSTEMS

CROSS-REFERENCE TO RELATED APPLICATIONS

This application is a continuation of U.S. patent application Ser. No. 14/445,922 filed on Jul. 29, 2014 which claims the benefit of U.S. Provisional Application No. 61/885,013 filed on Oct. 1, 2013, the contents of which are hereby incorporated by reference.

TECHNICAL FIELD

The present disclosure relates generally to systems for testing the performance of computer software applications and, more particularly, to systems and methods for testing the functionality of networked devices in real-time.

BACKGROUND

The worldwide web offers real-time access to large amount of data, enabling enterprises to provide information via widely accessible electronic communications networks in the form of a variety of computer programs. Such enterprises commonly spend a great deal of time and money testing the computer programs they develop in order to ascertain such programs' levels of functionality and performance. In order to test the operation of such computer programs, performance tests are performed to determine a program's behavior under both normal and anticipated peak load conditions, to troubleshoot performance problems, and to provide unit tests on a daily basis to developed modules.

Existing testing methods enable users to prepare testing scripts which include test parameters such as: the amount of networked devices to be used in the test, the actions to be taken by the networked devices through the test, and so on. Then, the test is executed respective of the script and a user device is used to monitor the performance of the system through the actions taken during the test. Upon identification of an event which requires additional testing parameters or tuning of the existing testing parameters, the test is terminated and a new test that includes the new and/or tuned testing parameters is executed. Such prior art solutions are static, as the additional required parameters can only be added upon termination of the originally executed test.

Existing methods for cloud load testing typically involve utilizing a cloud testing service provided by a cloud service vendor to generate web traffic originating from various locations around the world. Such testing often simulates many users in order to test services operating during peak anticipated loads. Some existing cloud load testing solutions are self-service (i.e., a user may implement the test without external services) but lack the ability to provide scalability for larger loads. Other existing solutions can scale for larger loads, but often require the involvement of professional services to run tests and, consequently, such tests may not be easily modified during testing. Such solutions are not as easily customizable to suit a given user's particular needs, especially if the user desires to change parameters during testing.

It would therefore be advantageous to provide a solution that would overcome the deficiencies of the prior art by enabling dynamic and real-time performance testing of networked systems.

SUMMARY

Certain disclosed embodiments also include a method for dynamically testing networked target systems (NTSs). The method comprises: receiving at least one instruction and at least one parameter generated respective of a plurality of actions provided in a received test specification; testing the performance of the NTS using the at least one instruction and the at least one parameter; and gathering information respective of the performance testing of the NTS.

Certain disclosed embodiments also include a system for dynamically testing networked target systems (NTSs). The system comprises: a processor; and a memory, the memory containing instructions that, when executed by the processor, configure the system to: received, by an action repeater device, at least one instruction and at least one parameter generated respective of a plurality of actions provided in a received test specification; test the performance of the NTS using the at least one instruction and the at least one parameter; and gather information respective of the performance testing of the NTS.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for dynamically testing networked systems. In various embodiments, a server is configured to receive a request from a user terminal to perform traffic simulation on a networked target system (NTS) as part of a performance testing procedure. Such a request often includes a command and a request to measure with respect of the NTS its response time, its availability under a particular workload, etc.

The server then, in a synchronous manner with the request, is configured to initialize a plurality of action repeater devices which are further configured to perform each action of the test procedure provided by the user terminal with respect of the networked target system respective of the request. Once operation begins, the server is configured to capture each action of the test procedure provided by the user terminal with respect to the networked target system. The server is further configured to provide the captured actions to the action repeater devices (ARDs). Then, the server is configured to gather information respective of the performance of the networked target system and a performance testing report is generated respective thereto.

Figure 1:
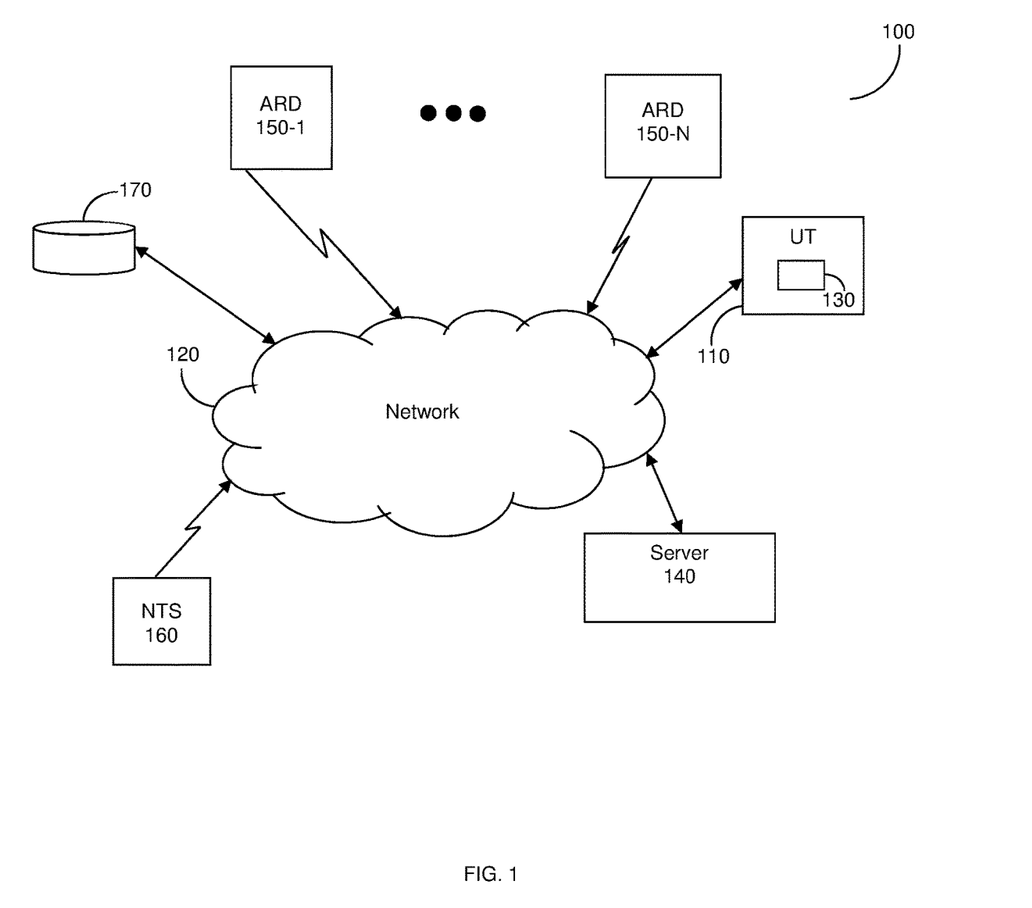
FIG. 1 is a schematic block diagram illustrating the various embodiments for dynamically testing networked target systems.

FIG. 1 shows an exemplary and non-limiting block diagram of a system 100 for dynamically testing networked target systems according to an embodiment. A user terminal 110 is communicatively connected to a network 120. The network 120 may be a wireless, cellular, or wired network, a local area network (LAN), a wide area network (WAN), a metro area network (MAN), the Internet, the worldwide web (WWW), a combination thereof, and so on. The user terminal 110 may be, but is not limited to, a personal computer (PC), a smart phone, a tablet computer, a multi-user computer terminal, and so on. In one embodiment, an agent 130 installed on the user terminal 110 is utilized to initiate the testing actions. In a non-limiting embodiment, the agent 130 sends test requests and/or information to and receives testing data from the server 140. The agent 130 is typically a software code that is installed in a memory of the user terminal 110 and executed by a processing element of such user terminal 110.

The user terminal 110 is further communicatively connected to a server 140 over the network 120. A plurality of action repeater devices (ARDs) 150-1 through 150-N (hereinafter referred to individually as an ARD 150 or collectively as ARDs 150) are also communicatively connected to the network 120. The ARDs 150 are configured by the server 140 to simulate the operation of a plurality of user terminals (e.g., user terminal 110) according to testing information.

In various embodiments, the testing information may be provided by a user, either directly through the user terminal 110 or via the agent 130 installed on user terminal 110. Testing information may include one or more test specifications such as, but not limited to, the number of initial ARDs 150 to be used, the respective geographic locations of such ARDs, the type(s) of ARDs to be used, and so on. The ARDs 150 in one embodiment are implemented in a cloud-computing platform or executed by servers installed in a cloud-computing platform. The cloud-computing platform may be, for example, a private cloud system, a public cloud system, or a hybrid cloud system. The ARDs 150 may be dynamically allocated to de-allocated from performing a specific test. The changes to the number of ARDs 150 may be made during any time during the test being performed.

In an embodiment, testing information may be, but is not limited to, a file containing one or more test specifications. In such embodiments, the user may be able to select a predetermined test specification rather than programming the test specification. The server 140 is configured to use the ARDs 150 in order to test the performance of a networked target system 160 (NTS) which is also communicatively connected to the network 120.

The NTS 160 is accessible to and monitored by the server 140 over the network 120. The NTS 160 may be a web resource, such as a web service, a web application, a web site, a function within a web site, and the like. The NTS 160 may be part of the cloud-computing platform, such as a private cloud system, a public cloud system, or a hybrid cloud system. Actions taken by the ARDs 150 simulate particular loading conditions that may impact performance of the NTS 160. Information related to the performance of the NTS 160 during simulation may then be collected. A NTS may be, but is not limited to, a website, such as the Amazon® website, the Google® website, the Ticketmaster® website, and the like. That is, that testing can be performed for e-commerce websites, search engines, online ordering systems and the like. The function to perform within the website can be configured as part of the test specification. In addition, the specification can be configured on which terminal the NTS should be tested. For example, the load performance for accessing a website from smartphones versus desktops can be tested as well.

As a non-limiting example, an owner of a shopping website may wish to test network performance during peak shopping seasons. To this end, based on the anticipated load (i.e., number of visitors to the website) during such seasons, ARDs may be initialized to simulate heavy traffic on the website. Based on the simulation, information related to the website's performance during heavy traffic may be gathered and assembled in a testing report. The ARDs 150 can be configured to test load from different various direction and during different time of the week day. Thus, during the test ARDs 150 may be added or removed from the test according to the test specification.

A database 170, which may be used to store information respective of the performance of the NTS 160, is further connected to the network 120. It should be apparent to one of ordinary skill in the art that the server 140 may be further configured to test the performance of a plurality of NTSs.

According to the disclosed embodiments, the server 140 is configured to receive a request to test the operation of at least one NTS (e.g., NTS 160) and respective testing information. As noted above, testing information may include one or more test specifications. A test specification may include, but is not limited to, the amount of initial ARDs 150 to be used, respective geographical locations of such ARDs 150, the type(s) of the ARDs 150, the type of test, type of terminal devices accessing the NTS, and so on.

Respective of the testing information, the server 140 is configured to set a plurality of ARDs 150 to perform actions for testing the NTS 160. Actions may be provided by the user terminal by, e.g., being included in the testing information, being performed by the user terminal, being performed by an agent installed on the user terminal, and so on. The server 140 is configured to capture, in real-time, the actions provided by the user terminal 110 with respect to the NTS 160 and set ARDs 150 based on each of the captured actions. The server 140 is further configured to allocate ARDs 150 for the test, set each allocated ARD with a set of instructions and parameters for the action to be performed by the ARD. The parameters may be, for example, network parameters of the NTS 160, such IP addresses, URLs, port IDs, protocol types, and so on. Each ARD 150 may be reconfigured with a different set of instructions and parameters during the test. In additional, ARDs 150 can be allocated to increase the test capacity or to remove ARDs 150 from test to reduce capacity of test. Therefore, the server 140 by configuring the ARDs 150 provides dynamic testing solution for the NTS. The server 140 is further configured to gather information respective of the performance of the NTS 160 and to generate a performance testing report based on the information.

Figure 2:
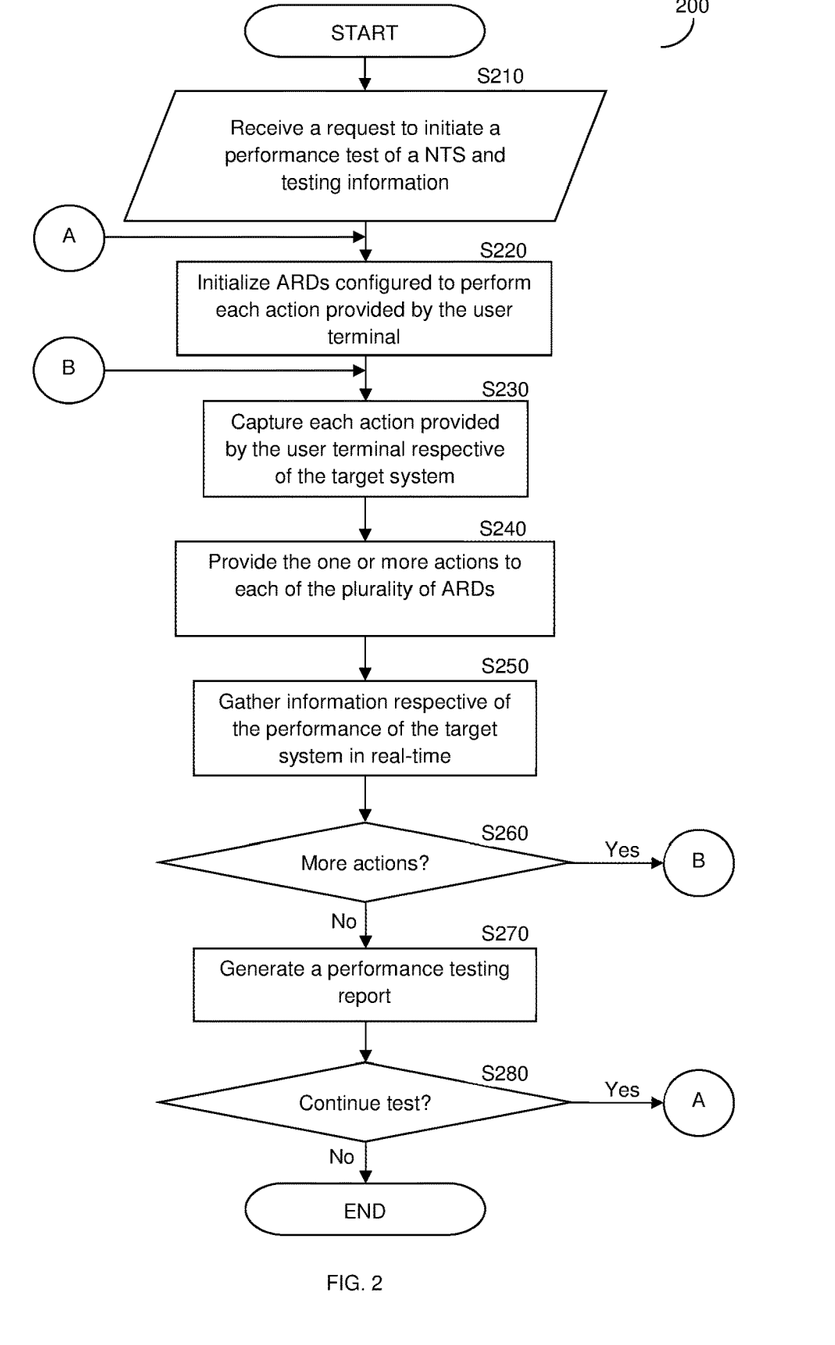
FIG. 2 is a flowchart illustrating a method for dynamically testing a networked target system in accordance with an embodiment.

FIG. 2 depicts an exemplary and non-limiting flowchart 200 describing a method for performance testing of a NTS in accordance with an embodiment. In S210, a request to initiate a performance test of at least one NTS (e.g., the NTS 160) and respective testing information is received from a user terminal (e.g., user terminal 110). The testing information includes at least one test specification discussed in detail above.

In S220, respective of the received testing information, each ARD of a plurality of ARDs (e.g., ARDs 150) is initialized. Each ARD is adjusted to perform each of the actions provided by the user terminal 110 respective of an NTS (e.g., the NTS 160). Operation of ARDs such as ARDs 150 is discussed further herein below with respect to FIG. 4.

In S230, each action specified in the test specification respective of the testing of NTS is captured. In an embodiment, this capture is performed by a server (e.g., server 140).

In S240, an initial set of ARDs are initialized, allocated or otherwise instantiated based on the test specification. In S245, each of the initial ARDs are set with instructions and parameters according to the captured actions. In S250, information respective of the performance of the NTS is gathered. In S260, it is checked whether setting of the ARDs should be updated based on the initial test specification or modified test specification later provided through the user terminal. The setting of ARDs may include changing the number of ARDs currently set for the test and/or changing the configuration of one or more ARDs based on the provided additional actions. If S260 results in a yes answer, execution continues with S230; otherwise, execution continues with S270.

In S270, a performance testing report is generated respective of the gathered information. The performance testing report may include, but is not limited to, estimated maximum capacity, errors received during testing, throughput of the NTS, response time, and so on. In S280, it is checked whether testing will continue and, if so, execution continues with S220; otherwise, execution terminates.

As a non-limiting example, a request to initiate a performance test of a NTS and testing information is received. In this example, the NTS being tested is a website which allows users to order food from restaurants online. The testing information indicates that 10,000 ARDs from the same geographic location will be utilized for the test. A user terminal performs several actions, including logging in to the site and ordering a few food items. These actions are captured and provided to the ARDs. Each ARD repeats the actions provided to it, thereby simulating 10,000 more users of the website performing the actions. Information related to the simulation is gathered and assembled to generate a performance testing report.

As another non-limiting example, a request to initiate a performance test of a NTS and testing information is received. In this example, the NTS being tested is a shopping website. The testing information indicates that 100,000 ARDs from 5 different geographic locations will be utilized for the test. Additionally, the testing information includes at least one test specification providing actions to be taken by each ARD. In this example, all ARDs will log in to the website, but some ARDs will make purchases, while others will return purchased items. These actions are captured and provided to the ARDs. Each ARD repeats the actions provided to it, thereby simulating 100,000 more users of the website performing such actions. Information related to the simulation is gathered and assembled to generate a performance testing report.

Figure 3:
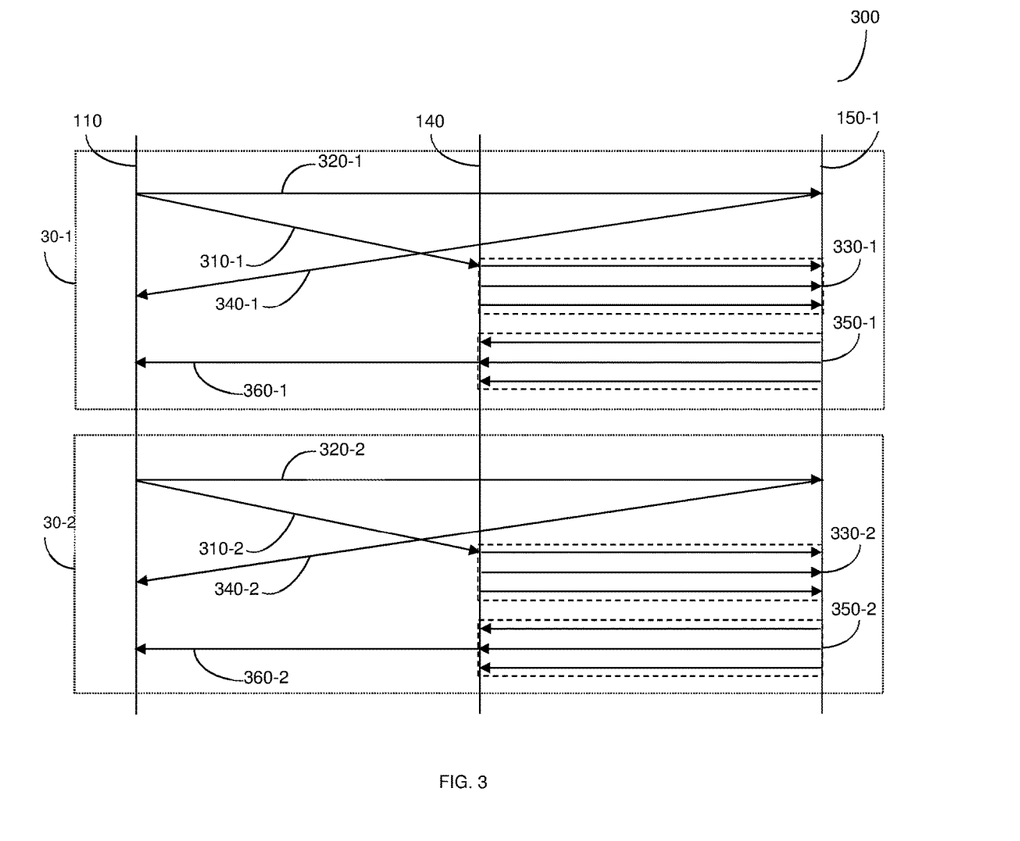
FIG. 3 is a schematic communication diagram illustrating interactions between ARDs while performing a method for dynamically testing a networked target system in accordance with an embodiment.

FIG. 3 depicts an exemplary and non-limiting schematic communication diagram 300 illustrating a method for dynamically testing a networked target system (NTS) in accordance with the embodiment described in FIGS. 1 and 2. The schematic communication diagram 300 demonstrates two cycles of captures of actions provided by the user terminal 110 and performance of the captured actions by the plurality of ARDs 150. In the first cycle 30-1, the method starts when a request 310-1 to initiate a performance testing is sent from the user terminal 110 over the network 120 and received by the server 140. An action 320-1 is provided by the user terminal 110 with respect to the NTS 160 (NTS 160 not shown in FIG. 3). In an embodiment, action 320-1 may be a set of more than one action.

Respective of the action 320-1 and the request 310-1, each of the plurality of ARDs 150 is initialized to perform action(s) 330-1. Action(s) 330-1 are the same actions as the action(s) 320-1. Respective of the action(s) 320-1, a response 340-1 is sent by the NTS 160 to the user terminal 110 and a response(s) 350-1 is sent by the NTS 160 to the server 140. The server 140 is configured to gather information respective of the system based on the response(s) 350-1. Respective of the gathered information, in 360-1, the server 140 is configured to generate a performance testing report and sends the report to the user terminal 110.

The second cycle 30-2 shows the capture and performance of another action 320-2 with the plurality of ARDs according to an embodiment. The cycle starts when a request 310-2 to initiate a performance testing is sent from the user terminal 110 over the network 120 and received by the server 140. An action 320-2 is provided by the user terminal 110 with respect to the NTS 160 (NTS 160 not shown in FIG. 3). In a further embodiment, action 320-2 may be a set of actions.

Respective of the action 320-2 and the request 310-2, each of the plurality of ARDs 150 is initialized to perform action(s) 330-2. Action(s) 330-2 are the same actions as the action(s) 320-2. Respective of the action(s) 320-2, a response 340-2 is sent by the NTS 160 to the user terminal 110 and a response(s) 350-2 is sent by the NTS 160 to the server 140, wherein the server 140 is configured to gather information respective of the system based on the response(s) 350-2. Respective of the gathered information, in 360-2, the server 140 is configured to generate a performance testing report and to send the report to the user terminal 110.

Figure 4:
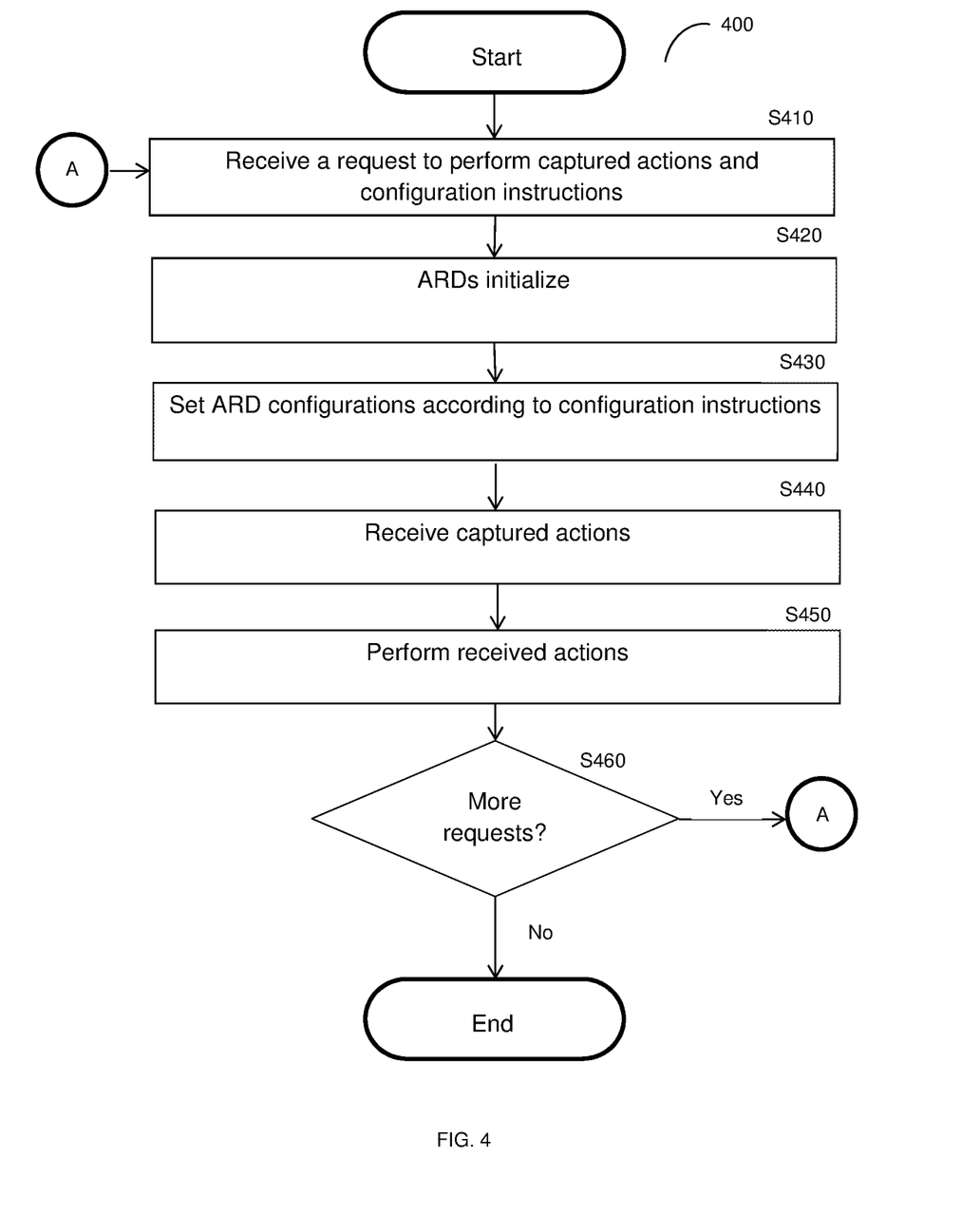
FIG. 4 is a flowchart illustrating operation of action repeater devices according to an embodiment.

FIG. 4 is an exemplary and non-limiting flowchart 400 illustrating operation of action repeater devices (ARDs, e.g., ARDs 150) according to an embodiment. In S410, a request to perform captured performance testing actions, configuration instructions and parameters are received. In an embodiment, such request and instructions may be received from a server (e.g., server 140). In another embodiment, configuration instructions may be retrieved from, e.g., a storage device. Captured performance testing actions include all actions provided by, e.g., a user terminal (e.g., user terminal 110) such that, when performed by the ARDs, all actions originally provided by the user terminal are repeated by ARDs. Configuration instructions are typically determined based on testing information provided respective of the testing to be performed, and may include, but are not limited to, which ARDs to initialize, which actions to be repeated by each ARD, and so on.

Responsive to the request, in S420, the ARDs initialize. In S430, each ARD sets its respective configuration according to the received configuration instructions and parameters. In an embodiment, each ARD may receive different configuration instructions and parameters. In order to test a response time of a website when accessed, a configuration instruction may be sending hypertext transfer protocol (HTTP) request the configuration parameter may be a URL of the website. The ARD will measure that the time elapsed until an HTTP response has been received from the website. The measured time is reported to the server 140. The ARD can repeat that action predefined every time interval.

In S440, the captured performance testing actions are received. Such captured actions may be received from, e.g., a server, a user device, a storage device, and so on. In S450, the received performance testing actions are performed. In S460, it is checked whether additional requests to perform captured actions have been received and, if so, execution continues with S410; otherwise, execution terminates.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A computerized method for conducting performance testing of a networked target system (NTS), comprising:
    receiving, with one or more processors, at least one instruction and at least one parameter corresponding to a plurality of different actions provided in a received test specification, wherein the test specification indicates a plurality of different geographic locations form which load is to be applied to an NTS;
    testing with one or more processors, the performance of the NTS using the at least one instruction and the at least one parameter, wherein the testing comprises applying load to the NTS with request to the NTS from the plurality of different geographic locations; and
    gathering, with one or more processor, information respective of the performance testing of the NTS.

2. The computerized method of claim 1, further comprising:
    dynamically changing the at least one instruction and the at least one parameter based on the received test specification or a modified test specification.

3. The computerized method of claim 1, wherein the NTS is a web resource.

4. The computerized method of claim 1, wherein the NTS is partially or completely in a cloud-computing platform, wherein the cloud-computing platform is at least one of: a public cloud system, a private cloud system, and a hybrid cloud system.

5. The computerized method of claim 1, wherein the ARD is deployed in a cloud-computing platform, wherein the cloud-computing platform is at least one of: a public cloud system, a private cloud system, and a hybrid cloud system.

6. The computerized method of claim 1, wherein the information respective of the performance testing includes at least one of:
    an estimated maximum capacity;
    if at least one error was received during testing, the at least one error received during testing;
    a throughput of the NTS; and
    a response time of the NTS.

7. One or more non-transitory computer readable media having stored thereon instructions configured to cause one or more processors to effectuate operations, comprising:
    receiving, with one or more processors, at least one instructions and at least one parameter corresponding to a plurality of different actions provided in a received test specification;
    testing, with one or more processors, the performance of an NTS using the at least one instruction and the at least one parameter; and
    gathering, with one or more processors, information respective of the performance testing of the NTS.

8. A system configured to dynamically conduct performance testing of a networked target system (NTS), comprising:
    a processor; and
    a memory, the memory containing instructions that, when executed by the processor, configure the system to:
        receive, by an action repeater device, at least one instruction and at least one parameter corresponding to a plurality of different actions provided in a received test specification, wherein the test specification indicates a plurality of different geographic locations from which load is to be applied to an NTS;
        test the performance of the NTS using the at least one instruction and the at least one parameter, wherein the testing comprises applying load to the NTS with requests to the NTS from the plurality of different geographic locations; and
        gather information respective of the performance testing of the NTS.

9. The system of claim 8, wherein the system is further configured to:
    dynamically change the at least one instruction and the at least one parameter based on the received test specification or a modified test specification.

10. The system of claim 8, wherein the NTS is a web resource.

11. The system of claim 8, wherein the NTS is part of a hybrid cloud system.

12. The system of claim 8, wherein the ARD is deployed in a cloud-computing platform, wherein the cloud-computing platform is a hybrid cloud system.

13. The system of claim 8, wherein the testing report performance comprises:
    an estimated maximum capacity;
    at least one error received during testing;
    a throughput of the NTS; and
    a response time of the NTS.

14. The method of claim 1, wherein the test specification indicates testing for accessing the NTS from a given type of user device, the testing comprises:
applying a load to the NTS that simulates the given type of user device performing the plurality of actions on the NTS, wherein types of user devices include a smartphone and a desktop computer.

15. The method of claim 1, wherein the test specification includes:
an amount of simulated user devices to be used in testing;
respective geographical locations from the plurality of different geolocations for the simulated user devices;
a plurality of types of the simulated user devices; and
a type of test.

16. The method of claim 1, wherein the operations comprise:
identifying the test specification by receiving a selection of a predetermined test specification from a user terminal.

17. The method of claim 1, wherein the operations comprise:
at least partially defining at least some of the plurality of actions by receiving captured actions performed by a user terminal with respect to the NTS.

18. The method of claim 1, wherein:
the method comprises dynamically changing the at least one instruction or the at least one parameter based on the received test specification;
the plurality of actions include selecting items on a website with a plurality of simulated user devices in the plurality of different geolocations simulating a plurality of different types of user devices;
gathering information comprises determining elapsed times until hypertext transport protocol responses are received from the NTS to the requests from the simulated user devices;
the at least one instruction is a configuration instruction specifying at least part of an application-layer request;
the at least one parameter identifies a network address and port of the NTS;
testing comprises simulating load on the NTS from more than 10,000 users; and
the method comprises instantiating a first number of simulated user devices testing the NTS and then, after some testing, dynamically changing the number of simulated user devices to a second number of simulated user devices testing the NTS, the first number being different from the second number.

19. The method of claim 1, comprising:
steps for dynamic and real-time performance testing of networked systems.

20. The system of claim 8, wherein the test specification indicates testing for accessing the NTS from a given type of user device, the testing comprises:
applying load to the NTS that simulates the given type of user device performing the plurality of actions on the NTS, wherein types of user devices include a smartphone and a desktop computer.

21. The system of claim 8, wherein the test specification includes:
an amount of simulated user devices to be used in testing;
respective geographical locations from the plurality of different geolocations for the simulated user devices;
a plurality of types of the simulated user devices; and
a type of test.

22. The system of claim 8, wherein:
the system is configured to dynamically change the at least one instruction or the at least one parameter based on the received test specification;
the plurality of actions include selecting items on a website with a plurality of simulated user devices in the plurality of different geolocations simulating a plurality of different types of user devices;
gathering information comprises determining elapsed times until hypertext transport protocol responses are received from the NTS to the requests from the simulated user devices;
the at least one instruction is a configuration instruction specifying at least part of an application-layer request;
the at least one parameter identifies a network address and port of the NTS;
testing comprises simulating load on the NTS from more than 10,000 users; and
the method comprises instantiating a first number of simulated user devices testing the NTS and then, after some testing, dynamically changing the number of simulated user devices to a second number of simulated user devices testing the NTS, the first number being different from the second number.

23. A computerized method for conducting performance testing of a networked target system (NTS), comprising:
receiving, with one or more processors, at least one instruction and at least one parameter corresponding to a plurality of different actions provided in a received test specification;
testing, with one or more processors, the performance of an NTS using the at least one instruction and the at least one parameter, wherein testing comprises:
dynamically changing the at least one instruction or the at least one parameter based on the received test specification, and wherein:
the plurality of actions include selecting items on a website with a plurality of simulated user devices in a plurality of different geolocations simulating a plurality of different types of user devices;
the at least one instruction is a configuration instruction specifying at least part of an application-layer request;
the at least one parameter identifies a network address and port of the NTS; and
testing comprises simulating load on the NTS from more than 10,000 users; and
instantiating, with one or more processors, a first number of simulated user devices testing the NTS and then, after some testing, dynamically changing the number of simulated user devices to a second number of simulated user devices testing the NTS, the first number being different from the second number; and
gathering, with one or more processors, information respective of the performance testing of the NTS, wherein gathering information comprises determining elapsed times until hypertext transport protocol responses are received from the NTS to requests from the simulated user devices.

24. The method of claim 20, wherein:
the test specification indicates the plurality of different geographic locations from which the load is to be applied to the NTS, and
wherein the testing comprises applying load to the NTS with the requests to the NTS from the plurality of different geographic locations, the requests corresponding to the selections of the items on the website.

25. The method of claim 20, wherein the test specification indicates:
   an amount of simulated user devices to be used in testing;
   respective geographical locations from the plurality of different geolocations for the simulated user devices;
   the plurality of types of the simulated user devices; and
   a type of test.

* * * * *